(12) United States Patent
Keidel et al.

(10) Patent No.: US 8,327,829 B2
(45) Date of Patent: Dec. 11, 2012

(54) INJECTOR MOUNTING SYSTEM (75) Inventors: Sean Keidel, Jackson, MI (US); Stephen Thomas, Laingsburg, MI (US); Jeremy D. Popovich, Brooklyn, MI (US); Jeffrey Broderick, Ridgefield, CT (US); Samuel Hiss, Clarklake, MI (US); Ryan Floyd, Mason, MI (US); Collin Sullivan, Midland, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 359 days.

(21) Appl. No.: 12/698,488

(22) Filed: Feb. 2, 2010

(65) Prior Publication Data
US 2010/0192913 A1    Aug. 5, 2010

Related U.S. Application Data (60) Provisional application No. 61/206,682, filed on Feb. 2, 2009.

(51) Int. Cl.
*F02M 55/02* (2006.01)
*F01N 3/10* (2006.01)
(52) U.S. Cl. .......................... 123/470; 60/303
(58) Field of Classification Search .................. 123/470; 60/295, 303
See application file for complete search history.

(56) References Cited

U.S. PATENT DOCUMENTS

| 2,719,055 | A |   | 9/1955 | Lauck |   |
|---|---|---|---|---|---|
| 2,834,087 | A |   | 5/1958 | Herman |   |
| 3,170,748 | A |   | 2/1965 | Horssen |   |
| 3,589,388 | A |   | 6/1971 | Haneline, Jr. |   |
| 5,121,731 | A | * | 6/1992 | Jones | 123/470 |
| 6,513,323 | B1 | * | 2/2003 | Weigl et al. | 60/286 |
| 6,996,976 | B2 | * | 2/2006 | Rumminger et al. | 60/295 |
| 7,823,564 | B2 | * | 11/2010 | Edoardo et al. | 123/470 |
| 8,127,538 | B2 | * | 3/2012 | Pollitt et al. | 60/303 |
| 2006/0107655 | A1 | * | 5/2006 | Hanitzsch et al. | 60/286 |
| 2010/0154746 | A1 | * | 6/2010 | Fischer et al. | 123/456 |
| 2010/0320285 | A1 | * | 12/2010 | Haeberer et al. | 239/132 |

FOREIGN PATENT DOCUMENTS
WO    WO 2008080695    *    7/2008

* cited by examiner

*Primary Examiner* — Thomas Moulis
(74) *Attorney, Agent, or Firm* — Wood, Phillips, Katz, Clark & Mortimer (57) ABSTRACT

An injector mount system (30) is provided for mounting an injector (22) to an exhaust flow conduit (21) in an exhaust treatment system (10). The injector (22) includes a housing (32) having an open end (46) that mounts an orifice/nozzle (38). The injector mount system (30) includes a boss (62) fixed to the exhaust flow conduit (21), and an end cap (44) of the injector (22) that is attached to the housing (32), closing the open end (46) and securing the orifice/nozzle (38) in the open end (46). The boss (62) and end cap (44) include mating flanges (60,64) that define a non-threaded connector for securing the injector (22) to the exhaust flow conduit (21). The mating flange (60) of the end cap (44) being formed as a unitary part of the end cap (44), and the mating flange (64) of the boss being a unitary part of the boss (62).

8 Claims, 10 Drawing Sheets

INJECTOR MOUNTING SYSTEM

CROSS-REFERENCE TO RELATED APPLICATIONS

This application claims the benefit of the filing date of U.S. Provisional Application No. 61/206,682, filed Feb. 2, 2009, which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to injector mounting systems, and more particularly to systems for mounting an injector within an exhaust treatment system, and even more particularly to systems for mounting an injector within a diesel exhaust gas aftertreatment system.

BACKGROUND OF THE INVENTION

It is known in the automotive industry to include injectors in exhaust treatment systems, particularly in diesel exhaust gas aftertreatment system for injecting a fluent substance such as a suitable fuel, oxygenator or reductant that will assist in the treatment of the exhaust gas. One known system for mounting such injectors utilizes a plurality of bolt studs that extend from an exhaust pipe as part of a bolted flange-type connection for the injector. While such a mount system may be suitable for its intended purpose, there is always room for improvement.

SUMMARY OF THE INVENTION

In accordance with one feature of the invention, an injector mount system is provided for mounting an injector to an exhaust flow conduit in an exhaust treatment system, the injector including a housing having an open end that mounts an orifice/nozzle that directs an injection flow into the exhaust flow conduit. The mount system includes a boss that is fixed to the exhaust flow conduit and an end cap of the injector, the end cap attached to the housing, closing the open end, and securing the orifice/nozzle in the open end. The boss and the end cap include mating flanges that define a connector for securing the injector to the exhaust flow conduit. The mating flange of the end cap being formed as a unitary part of the end cap, and the mating flange of the boss being a unitary part of the boss. The connector being free of threaded fasteners.

In one feature, the connector is a v-band type connector and the flanges combine to define a v-shaped cross-section that can be clamped by a v-band to secure the injector to the exhaust conduit.

In one feature, the connector is a bayonet type connector, with the mating flange of the boss defining a plurality of grooves and the mating flange of the end cap defining a plurality of lugs that are engageable with the grooves to secure the injector to the exhaust conduit.

In one feature, the lugs are defined by cylindrical pins. In yet a further feature, the pins are unitary parts of the mating flange of the end cap.

In one feature, the mating flange of the boss includes a plurality of stamped components defining the grooves.

In one feature, the mating flange of the boss includes a first ring having the grooves formed therein. In a further feature, the boss further includes a second ring fixed to the first ring to provide structural support to the first ring.

In one feature, the mating flange of the boss includes a stop detent that locks one of the lugs into a fully engaged position in one of the grooves.

Other objects, features, and advantages will become apparent from a review of the entire specification, including the appended drawings.

DETAILED DESCRIPTION OF THE PREFERRED EMBODIMENT

Figure 1:
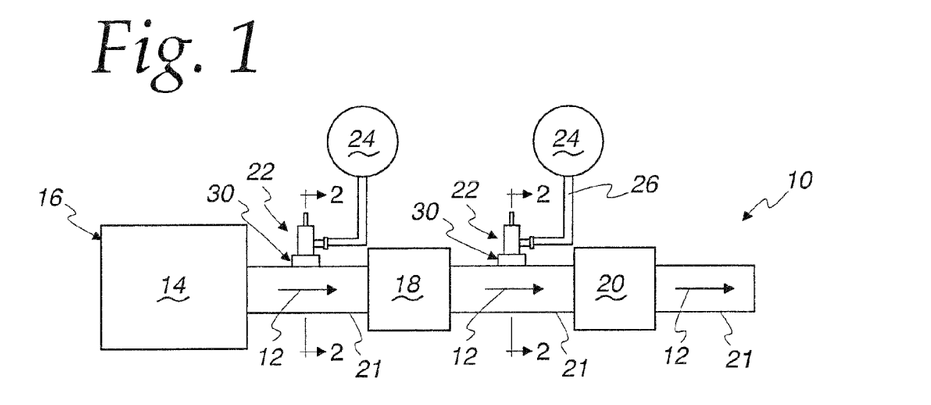
FIG. 1 is a diagrammatic representation of a diesel exhaust gas treatment system including an injector mount system embodying the invention.

A diesel exhaust gas aftertreatment system 10 is shown somewhat generically in FIG. 1 for treating the exhaust 12 from a diesel combustion process 14, such as a diesel compression engine 16. The exhaust 12 will typically contain oxides of nitrogen ($NO_x$) such as nitric oxide (NO) and nitrogen dioxide ($NO_2$) among others, particular matter (PM), hydrocarbons, carbon monoxide (CO), and other combustion byproducts. The system 10 can include one or more components 18 and 20 to assist in the treatment of the exhaust 12, including, for example, any or all of a burner or combustor, a diesel particulate filter (DPF), and a $NO_x$ reducing device, such as a selective catalytic reduction catalyst (SCR) or a lean $NO_x$ trap. The components are connected by exhaust flow conduits 21 that are of any suitable construction, including housing that are integrated with the components 18 and 20 and/or exhaust pipes or tubing. It is common to employ an injector 22 either upstream or downstream (both examples shown in FIG. 1) of such components to inject a fluent substance into the exhaust 12, such as, for example, a suitable fuel (a couple examples of which are hydrogen and hydrocarbons), an oxygenator (such as air), or a nitrogenous reductant, such as ammonia, urea, hydrocarbons, hydrogen, or syngas. In the illustrated embodiment, each injector 22 is connected to a pressurized supply 24 for the corresponding fluent substance via a supply conduit 26.

Figure 2:
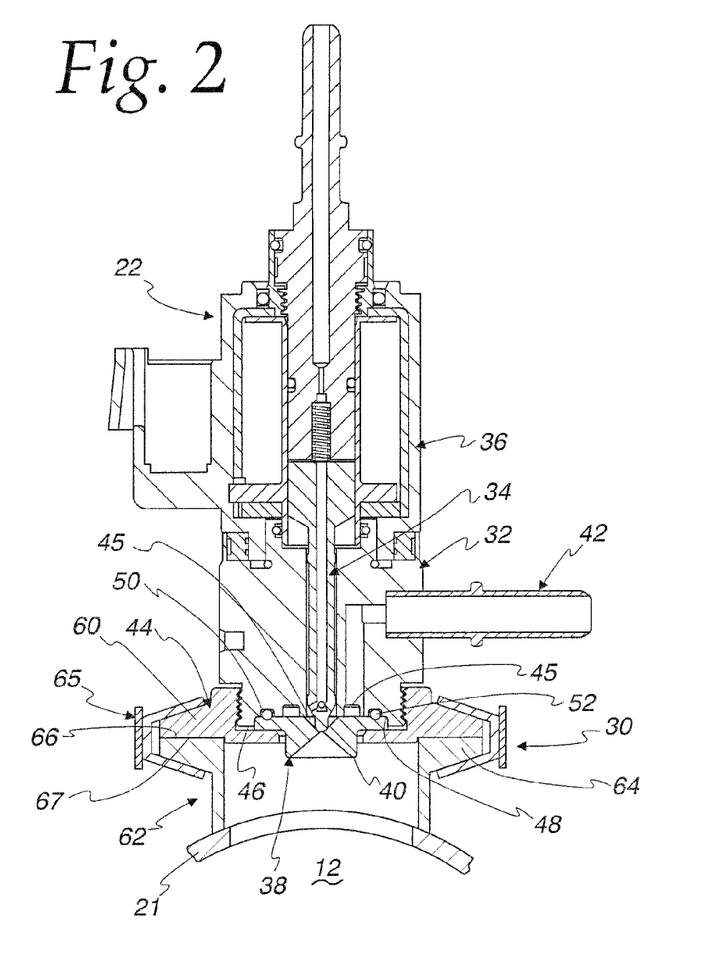
FIG. 2 is an enlarged, section view taken from lines 2-2 in FIG. 1.

While any suitable construction for the injector 22 can be used in connection with the invention, one construction is shown in FIG. 2 in connection with an injector mount system 30 embodying the invention. The injector 22 includes a housing 32, a valve 34, a molded coil assembly 36 for selectively actuating the valve 34, an orifice/nozzle 38 in the form of an orifice plate 40 for directing an atomized flow of the fluent substance into the exhaust 12, a supply fitting 42 for connection with the supply conduit 26, and an end cap 44. The housing 32 has a number of flow passages 45 directed to an open end 46 of the housing 32 that defines a seat 48 for the orifice/nozzle 38, with the seat 48 including an annular o-ring groove 50 that receives an o-ring 52 for sealing the flow passages 45. In this regard, the connection of the end cap 44 to the housing 32 acts to secure the orifice/nozzle 38 in the seat 48 while compressing the o-ring 52 between the housing 32 and the orifice/nozzle 38 to create a seal. While any suitable connection can be made between the housing 32 and the end cap 44, it is preferred to having mating external and internal threads provided on the housing 32 and end cap 44, respectively to attach the end cap 44 to the housing 32.

Figure 3:
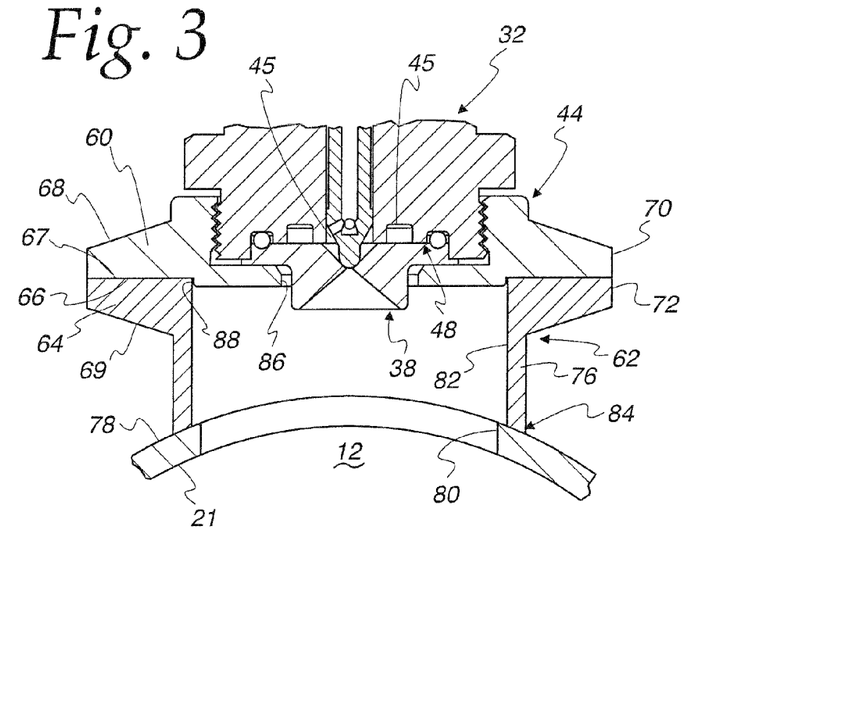
FIG. 3 is an enlarged view of a portion of FIG. 2.

The mount system 30 of FIG. 2 includes a flange 60 that is a unitary part of the end cap 44, a boss 62 fixed to the exhaust conduit 21 and having a flange 64 that is a unitary part of the boss 62, and a v-band clamp 65 engaged with both of the flanges 60 and 64 to clamp respective, planar, mating faces 66 and 67 of the flanges 60 and 64 against each other. In this regard, as best seen in FIG. 3 which shows the V-band clamp removed, each flange 60 and 64 define an outwardly extending frustoconical surface 68 and 69, respectively, that is engaged by the v-band clamp 65 and that terminates in a cylindrical, peripheral surface 70 and 72, respectively.

The boss 62 includes a cylindrical wall 76 that extends between the flange 64 and an outer surface 78 of the conduit 21 having a circular opening 80 formed, and defines a central opening 82 extending through the boss 62. The boss 62 can be formed as a separate component from the conduit 21 and subsequently joined thereto by a suitable weld joint, a suitable braze joint, or any other suitable bonding joint between the interface of the wall 76 and the conduit 21, as shown at 84 in FIG. 2, or the boss 62 can be formed as a unitary part of the conduit 21. If the boss 62 is formed as a separate component, it is important that the surface of the wall 76 that engages the surface 78 of the conduit 21 be countered to conform to the surface 78.

The end cap 44 further includes a cylindrical, central opening 86 for the orifice/nozzle 38, and an annular shoulder 88 that closely conforms to the opening 82 to locate, align, and center the injector 22 with respect to the opening 80 and the conduit 21.

Figure 4:
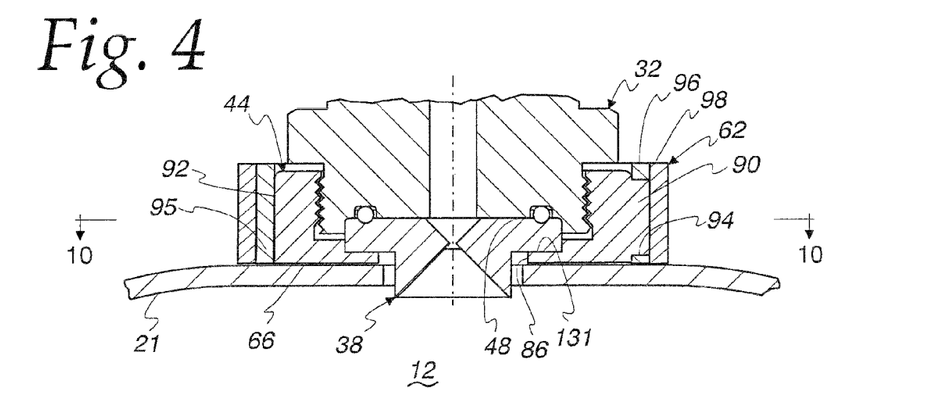
FIG. 4 is a view similar to FIG. 3 but showing an alternate embodiment of the injector mount system of the invention, and having some elements of the injector removed for purposes of illustration.

FIG. 4 shows an alternate embodiment for the mounting system 30 that utilizes a bayonet type connection in place of the v-band flange type connection. In this regard, the end cap 44 includes three lugs 90 (only one shown in FIG. 4) extending radially outwardly from a cylindrical peripheral surface 92 for engagement in corresponding grooves 94 (again only one shown in FIG. 4) provided in the boss 62. Preferably, the lugs 90 are equally spaced circumferentially from each other (i.e. 120 degree angular spacing), with the grooves 94 having corresponding spacing. For the embodiment illustrated in FIG. 4, the boss 62 is fixed to a flattened surface 95 on the conduit 21, rather than having the cylindrical wall 76 that is contoured to conform to the cylindrical profile of the conduit 21 as in the embodiment of FIGS. 2 and 3. Any suitable method can be used to fix the boss 62 to the surface, including welding, brazing, or bonding. The engagement of the lugs 90 in the grooves 94 clamps the mating faces 66 and 95 together and connects the injector 22 to the conduit 21.

Figures 5, 6, 7, 8, 9:
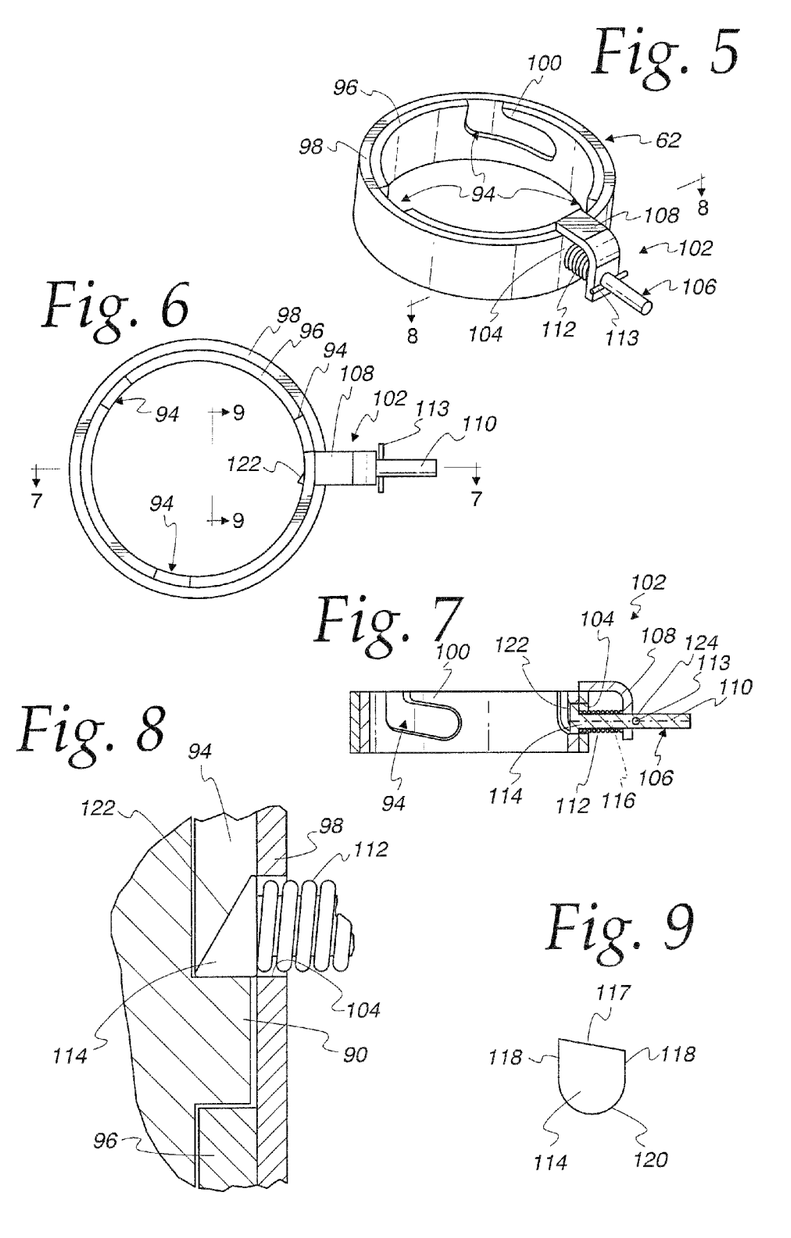
FIG. 5 is an isometric view from above showing one embodiment of a boss for the injector mount system of FIG. 4.
FIG. 6 is a top plan view of the boss of FIG. 5.
FIG. 7 is a section view taken from line 7-7 in FIG. 6.
FIG. 8 is an enlarged section view taken from line 8-8 in FIG. 5.
FIG. 9 is an enlarged view of a detent head taken from line 9-9 in FIG. 6.

FIGS. 5-7 shows one possible construction for providing the grooves 94 in the boss 62. In this construction an inner ring 96 having the grooves 94 formed therethrough is surrounded by an outer ring 98 that is joined to the inner ring 96 to provide additional structural support. In this regard, it is particularly desirable to insure that the rings 96 and 98 are joined together (such as by bonding, welding, or brazing) at least at locations adjacent the upper edge 100 of each of the grooves 94 to prevent deformation of the ring 96 by any forces reacted therethrough. Preferably, a stop detent mechanism, shown generally at 102, is also provided as part of the boss 62 in this embodiment to lock the lugs 90 in a fully engaged position in the grooves 94, as shown in FIG. 8. As best seen in FIG. 7, the mechanism 102 includes a detent opening 104 formed in the outer ring 96, a detent 106, a detent bracket 108 extending from the outer ring 96 to mount the detent 106 for translation along a detent axis 110, a helical compression spring 112 mounted between the detent 106 and the bracket 108 to bias the detent 106 into a locked position extending into the corresponding groove 94, and a cross pin 113 extending through the detent 106 on a side of the bracket opposite from the ring 96 to limit translation of the detent 106 into the groove 94. As best seen in FIGS. 7-9, the detent 106 has a head 114 and an elongate cylindrical body 116 extending from the head 114 along the axis 110 to be slidably received in the bracket 108 for guided translation therein along the axis 110. The head 114 has angled upper surface 117, a pair of parallel side surfaces 118, a semi-cylindrical lower surface 120, and an angled or sloped face 122 (FIG. 8). The angled upper surface 117 conforms to the angled upper edge 100 of the corresponding groove 94, and the sloped face 112 allows the lug 90 to force the head 114 out of the groove 94 as the lug 90 moves into engagement with the groove. In this regard, the detent opening 104 in the ring 98 conforms to the peripheral shape of the head 114 defined by the surfaces 117, 118, and 120 to provide supported movement of the head 114 out of the groove 94 and into the opening 104. The head 114 translates back into the groove 94 after the lug 90 passes by the head 114 and into full engagement in the groove 94, as best seen in FIG. 8. The body 116 includes a transverse bore 124 that receives the cross pin 113, preferably with an interference fit.

Figure 10:
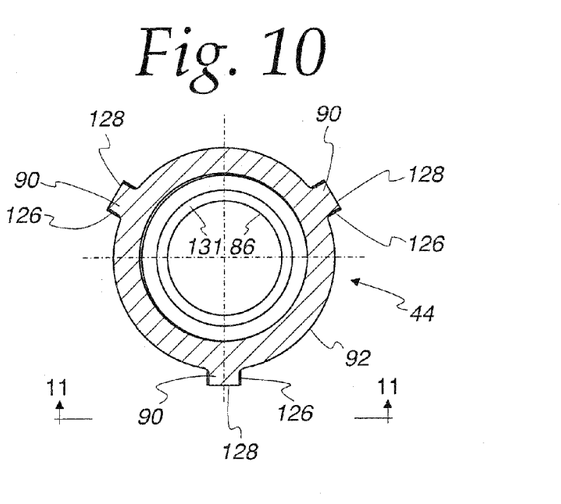
FIG. 10 is a view showing an end cap component of the mount system taken from line 10-10 in FIG. 4.
Figure 11:
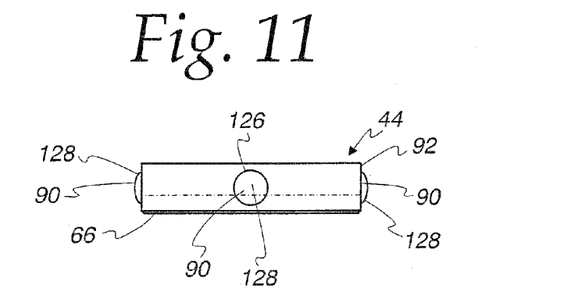
FIG. 11 is a view taken from line 11-11 in FIG. 10.
Figure 12:
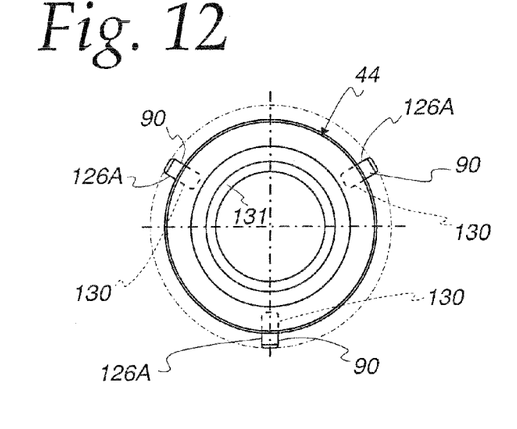
FIG. 12 is a plan view of an alternate end cap component to the one shown in FIGS. 10 and 11.
Figure 13:
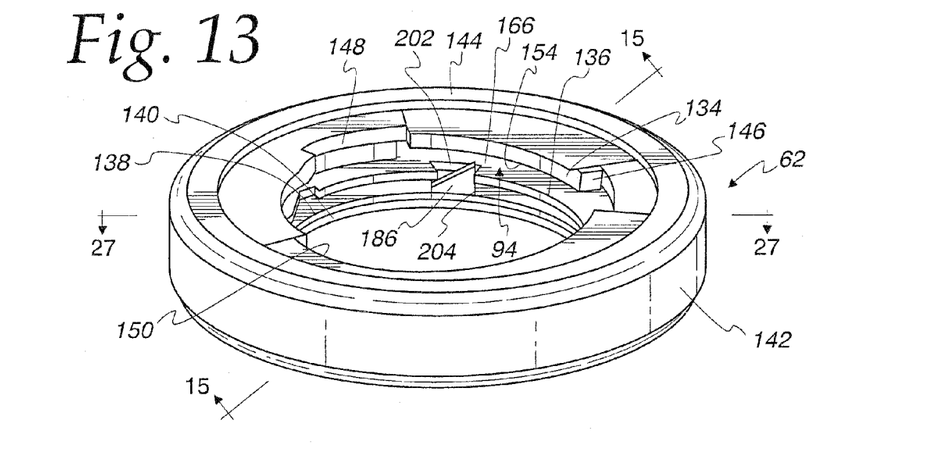
FIG. 13 is an isometric view from above showing an alternate embodiment of the boss for the mount system of the invention.

As seen in FIGS. 10 and 11, for engagement with the embodiment of the boss 62 shown in FIGS. 4-9, the lugs 90 of the end cap 44 are preferable in the form of cylindrical pins 126 that extend radially outward from peripheral surface 92, with each pin 126 terminating in an end surface 128. The pins 126 can either be formed as unitary parts of the end cap 44, as shown in FIGS. 10 and 11, or can be separate component pins 126A that are press fit into mating holes 130 in the end cap 44, as shown in FIG. 13. If press fit pins 126A are used, it may be desirable to adjust their diameter to insure that the strength of the end cap 44 is adequate, with a corresponding adjustment being made to the grooves 94 so that the groove width corresponds closely to the pin diameter. As best seen in FIG. 4, the end cap 44 can also include an annular seat 131 for receiving and locating the orifice/nozzle 38.

Figure 14:
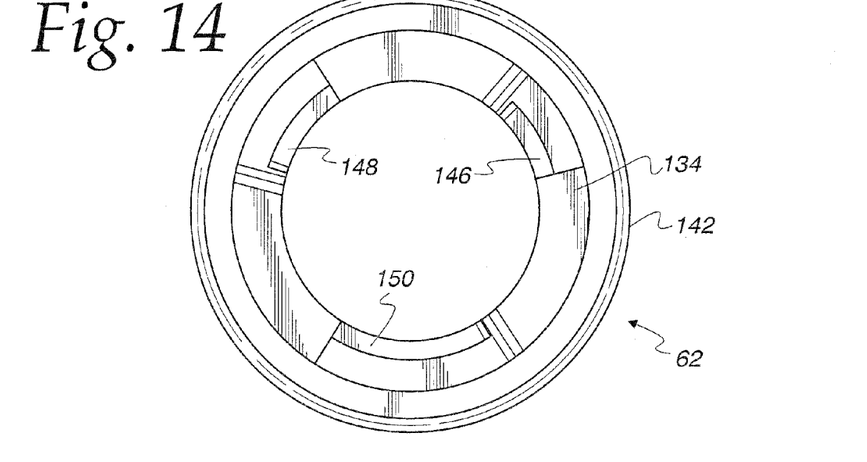
FIG. 14 is a plan view of the boss of FIG. 13.
Figure 15:
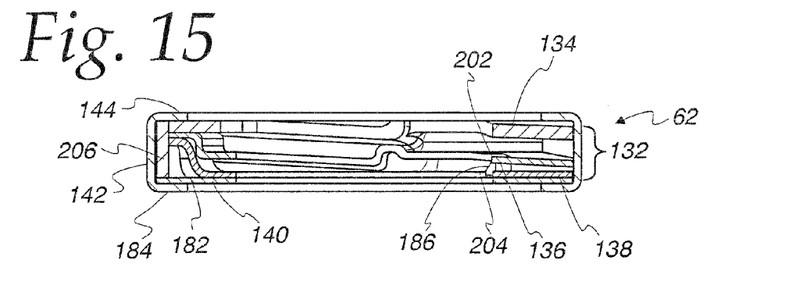
FIG. 15 is a section view taken from line 15-15 in FIG. 13.
Figure 16:
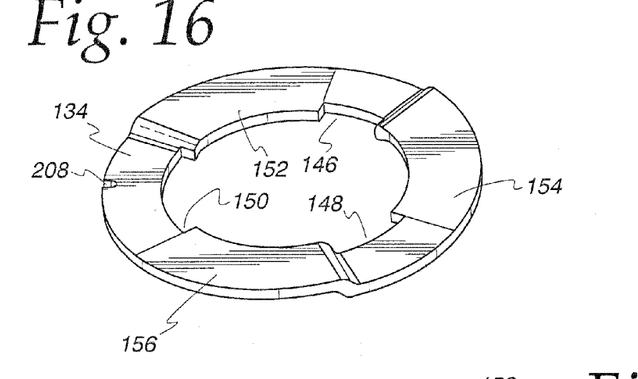
FIG. 16 is an isometric view from below of a stamped plate component of the boss of FIG. 14.
Figures 17, 18:
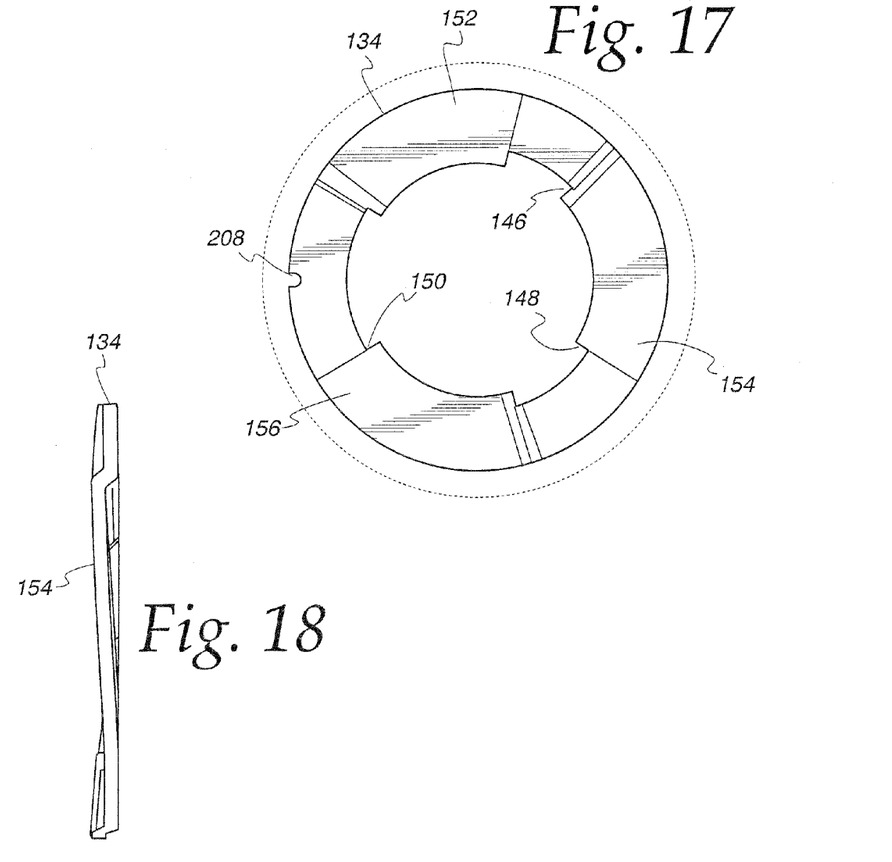
FIG. 17 is a bottom view of the stamped plate of FIG. 16.
FIG. 18 is a view taken from line 18-18 in FIG. 17.
Figure 19:
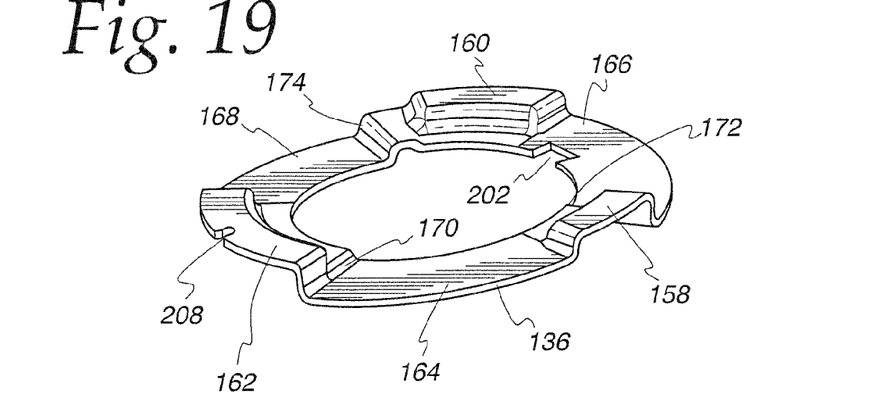
FIG. 19 is an isometric view from above of another stamped plate component of the boss of FIG. 13.
Figure 20:
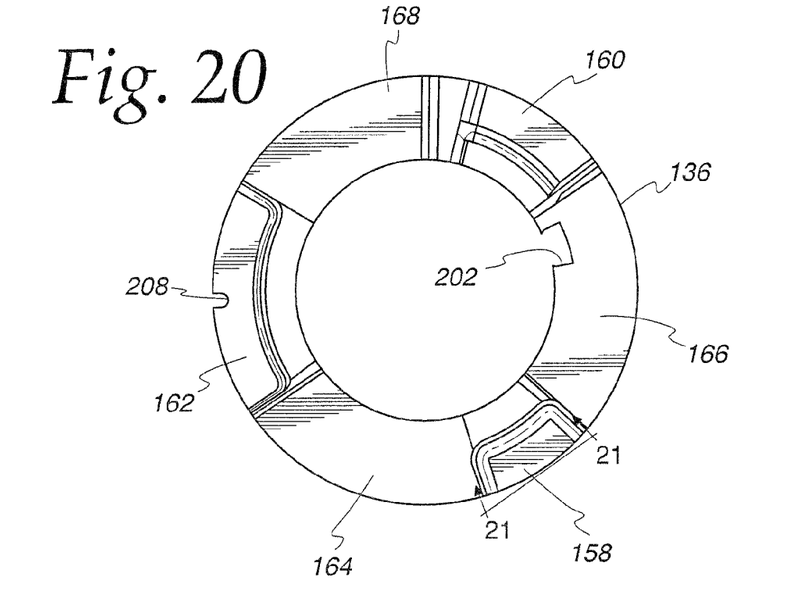
FIG. 20 is a plan view of the stamped plate of FIG. 19.
Figure 21:
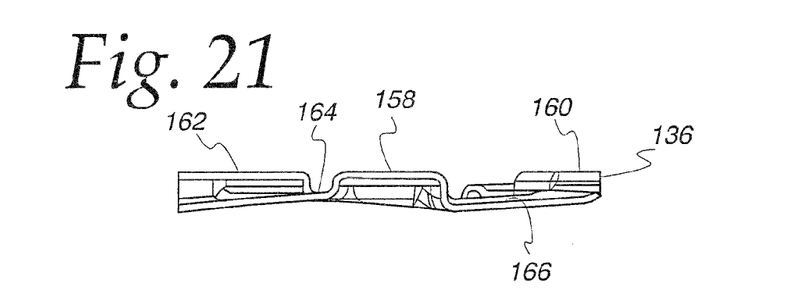
FIG. 21 is a view taken from line 21-21 in FIG. 20.
Figure 22:
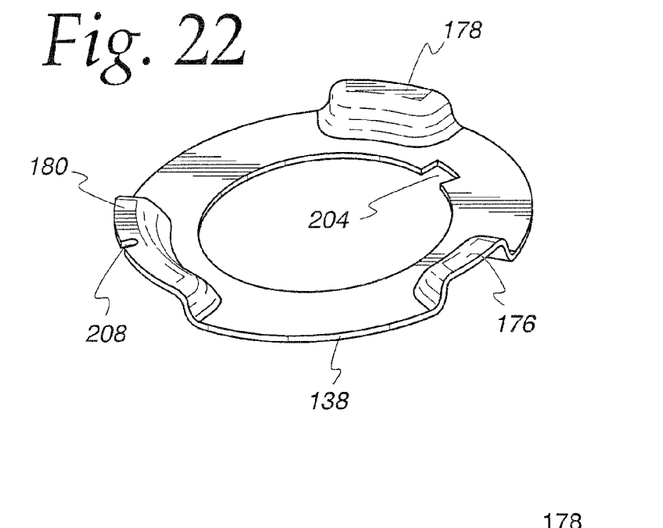
FIG. 22 is an isometric view from above of yet another stamped plate component of the boss of FIG. 13.
Figure 23:
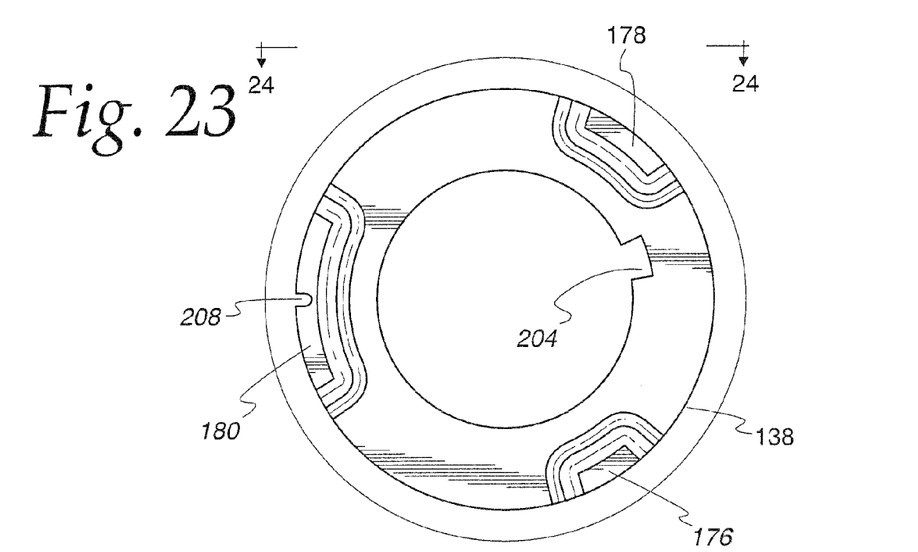
FIG. 23 is a plan view of the stamped plate of FIG. 22.
Figure 24:
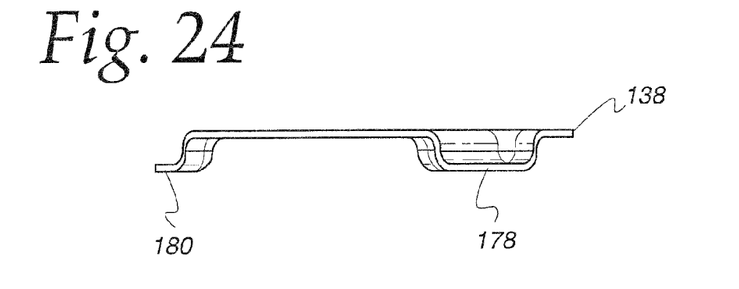
FIG. 24 is a view taken from line 24-24 in FIG. 23.
Figure 25:
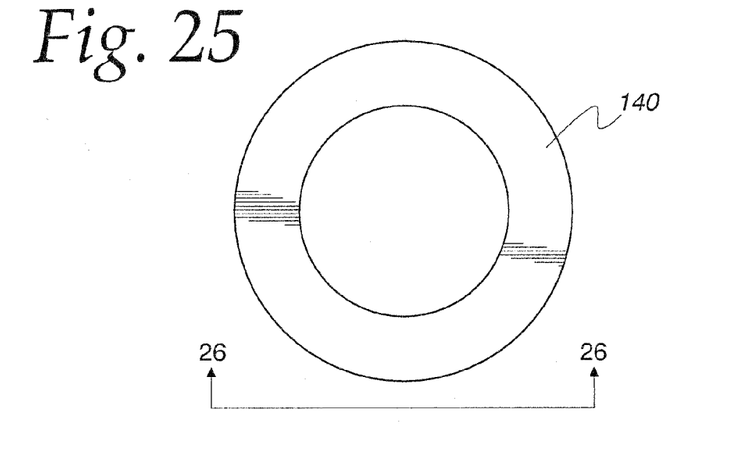
FIG. 25 is a plan view of another stamped plate component of the boss of FIG. 13.
Figure 26:
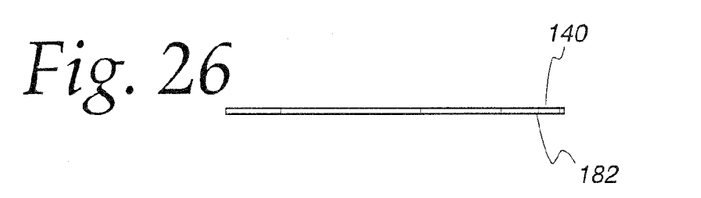
FIG. 26 is a view taken from line 26-26 in FIG. 27.

FIGS. 13-15 show another construction for providing the grooves 94 in the boss 62. In this construction, a stack 132 of stamped plates 134, 136, 138, and 140 are received in a stamped housing 142 that has a lip 144 that is swaged over the stack 132 to clamp the stack 132 in the housing 142. As best seen in FIGS. 16-18, plate 134 has three circumferentially extending slots 146, 148 and 150 that are sized to receive corresponding lugs 90 (describe in more detail below). Preferably, each of the slots 146, 148, and 150 has a different circumferential length that corresponds to the circumferential length of a specific one of the lugs 90 to ensure proper orientation of the injector 22 with respect to the exhaust duct 21. A circumferentially angled ramp surface 152, 154, and 156 extends from each of the notches 146, 148 and 150, respectively, to define an upper surface for each of the corresponding grooves 94. As best seen in FIGS. 19-21, plate 136 includes three upstanding supports 158, 160, and 162 that are circumferentially spaced to underlie the plate 134 at circumferential locations that correspond to the notches 146, 148, and 150, respectively. A circumferentially angled ramp surface 164, 166, and 168 extends clockwise from each of the supports 158, 160, and 162, respectively to define a lower surface for each of the corresponding grooves 94 and terminates in a radially extending stop surface 170, 172 and 174, respectively, that defines the end of the corresponding groove 94. As best seen in FIGS. 22-24, the plate 138 includes three upstanding supports 176, 178, and 180 that generally conform to and underlie each of the supports 158, 160, and 162, respectively. As best seen in FIGS. 25 and 26, the plate 140 has a flat, ring shape and provides a lower surface 182 for the stack 132 that abuts a lip 184 of the housing 142.

Figures 27, 28, 29:
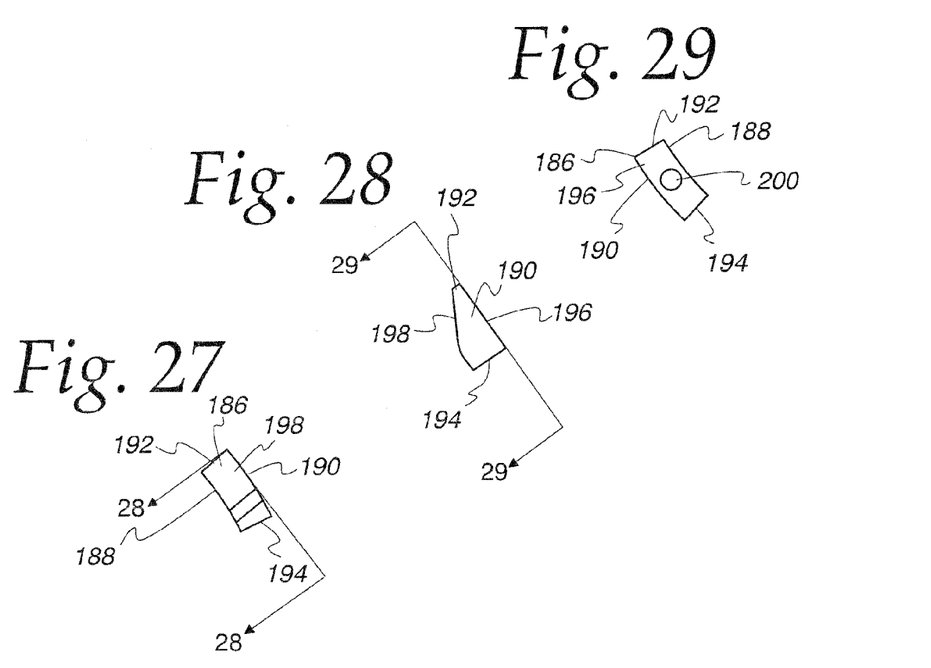
FIG. 27 is a plan view of a detent component taken from line 27-27 in FIG. 13
FIG. 28 is view taken from line 28-28 in FIG. 27.
FIG. 29 is a view taken from line 29-29 in FIG. 28.

As best seen in FIG. 14, the boss 62 of this embodiment also preferably includes a stop detent 186 (shown in retracted position) that is mounted to translate parallel to the central axis of the boss 62 into and out of the corresponding groove 94. As best seen in FIGS. 27-29, the detent 186 is provided in the form of a segment shaped block having arcuate radial inner and outer surfaces 188 and 190, a pair of radially extending side surfaces 192 and 194, a planar bottom surface 196, and a wedge shaped upper surface 198. A bore 200 is provided in the bottom surface 196 to receive a helical compression spring (not shown) that is sandwiched between the detent 186 and plate 140 to bias the detent 186 into the groove 94. The detent 186 is guided for translation into and out of the groove 94 by conforming notches 202 and 204 formed in the plated 136 and 138, respectively. Engagement of the corresponding lug 90 with the wedge shaped upper surface 198 forces the detent 186 to translate out of the groove 94 to allow the lug 90 to move into full engagement with the groove 94, at which point the lug 90 clears the detent 186 thereby allowing the detent 186 to translate back into the groove 94 trapping the lug 90 in the fully engaged position with the groove 94.

The boss 62 also includes a timing pin 206 that engages timing notches 208 in each of the plates 134, 136, and 138 to insure accurate angular alignment of the plates with each other.

Figure 30:
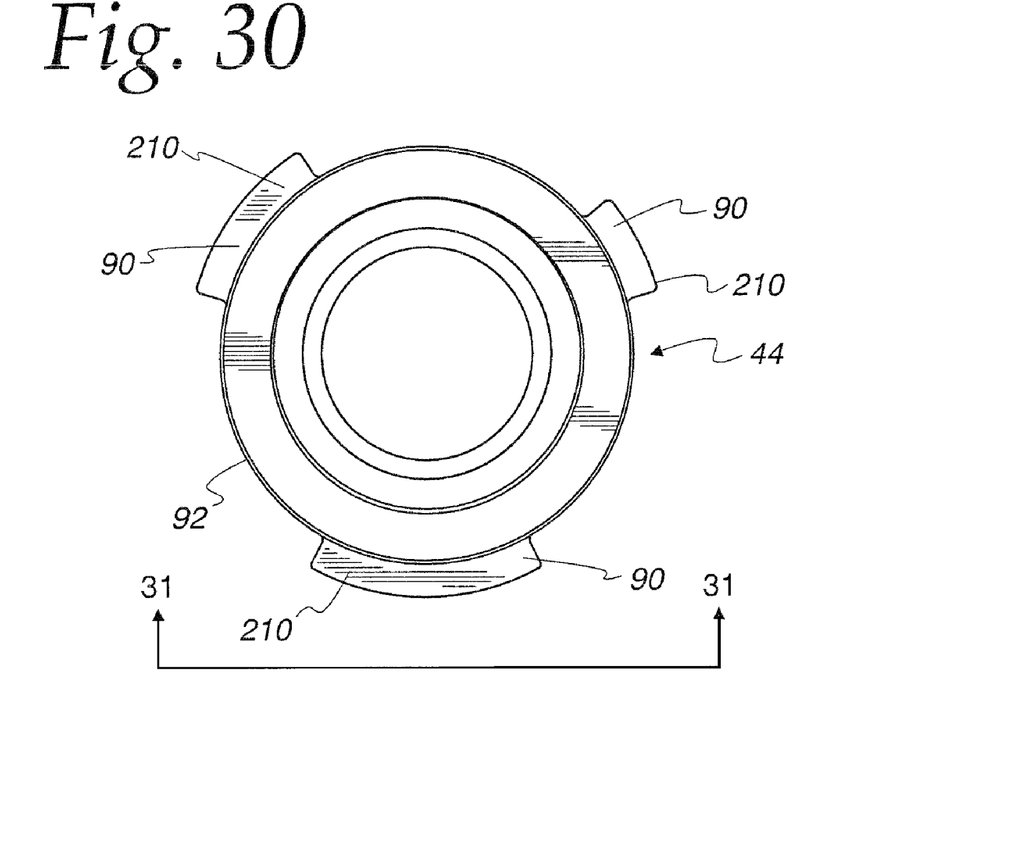
FIG. 30 is a plan view of another end cap embodiment for the mount system of the invention for use with the boss of FIGS. 13-29.
Figure 31:
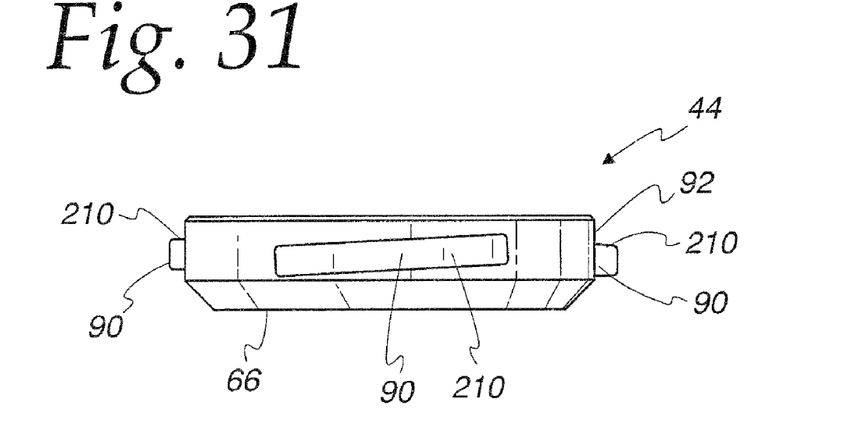
FIG. 31 is view taken from line 31-31 in FIG. 30.

As best seen in FIGS. 30 and 31, an embodiment of the end cap 44 is shown for use with the embodiment of the boss 62 of FIGS. 13-29. In this embodiment of the end cap 44, the lugs 90 are provided in the form of circumferentially extending, angled lands 210, with each of the lands 210 having a circumferential length that corresponds to one of the notches 146, 148 and 150 of the plate 134.

The invention claimed is:

1. An injector mount system provided for mounting an injector to an exhaust flow conduit in an exhaust treatment system, the injector including a housing having an open end that mounts an orifice/nozzle that directs an injection flow into the exhaust flow conduit, the injector mount system comprising:
    a boss that is fixed to the exhaust flow conduit; and
    an end cap of the injector, the end cap attached to the housing, closing the open end, and securing the orifice/nozzle in the open end, wherein the boss and the end cap include mating flanges that define a non-threaded connector for securing the injector to the exhaust flow conduit, the mating flange of the end cap being a unitary part of the end cap, and the mating flange of the boss being a unitary part of the boss.

2. The injector mount system of claim 1 wherein the connector is a v-band type connector and the flanges combine to define a v-shaped cross-section that can be clamped by a v-band to secure the injector to the exhaust conduit.

3. An injector mount system provided for mounting an injector to an exhaust flow conduit in an exhaust treatment system, the injector including a housing having an open end that mounts an orifice/nozzle that directs an injection flow into the exhaust flow conduit, the injector mount system comprising:
    a boss that is fixed to the exhaust flow conduit; and
    an end cap of the injector, the end cap attached to the housing, closing the open end, and securing the orifice/nozzle in the open end, wherein the boss and the end cap include mating flanges that define a non-threaded connector for securing the injector to the exhaust flow conduit, the mating flange of the end cap being a unitary part of the end cap, and the mating flange of the boss being a unitary part of the boss;
    wherein the connector is a bayonet type connector, with the mating flange of the boss defining a plurality of grooves and the mating flange of the end cap defining a plurality of lugs that are engageable with the grooves to secure the injector to the exhaust conduit.

4. The injector mount system of claim 3 wherein the lugs are defined by cylindrical pins.

5. The injector mount system of claim 4 wherein the pins are unitary parts of the mating flange of the end cap.

6. The injector mount system of claim 3 wherein the mating flange of the boss includes a plurality of stamped components defining the grooves.

7. The injector mount system of claim 3 wherein the mating flange of the boss includes a first ring having the grooves formed therein.

8. The injector mount system of claim 3 wherein the mating flange of the boss includes a stop detent that locks one of the lugs into a fully engaged position in one of the grooves.

* * * * *